United States Patent
Satoh

(10) Patent No.: US 7,825,928 B2
(45) Date of Patent: Nov. 2, 2010

(54) IMAGE PROCESSING DEVICE AND IMAGE PROCESSING METHOD FOR RENDERING THREE-DIMENSIONAL OBJECTS

(75) Inventor: Jin Satoh, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 889 days.

(21) Appl. No.: 10/594,376

(22) PCT Filed: Feb. 14, 2006

(86) PCT No.: PCT/JP2006/302518

§ 371 (c)(1),
(2), (4) Date: Dec. 8, 2006

(87) PCT Pub. No.: WO2006/090610

PCT Pub. Date: Aug. 31, 2006

(65) Prior Publication Data

US 2007/0211078 A1    Sep. 13, 2007

(30) Foreign Application Priority Data

Feb. 23, 2005   (JP)  ............................. 2005-047400

(51) Int. Cl.
G06T 15/00   (2006.01)
(52) U.S. Cl. ..................................... 345/422
(58) Field of Classification Search ................. 345/540, 345/614
See application file for complete search history.

(56) References Cited

U.S. PATENT DOCUMENTS

2003/0058244 A1   3/2003  Ramani et al.
2004/0189655 A1   9/2004  Perry et al.
2004/0212619 A1*  10/2004 Saito et al. .................. 345/441

FOREIGN PATENT DOCUMENTS

| JP | 2000-293709 A | 10/2000 |
| JP | 2000-338959   | 12/2000 |
| JP | 2003-123082 A | 4/2003  |
| JP | 2003-208627 A | 7/2003  |
| JP | 2003-528394 A | 9/2003  |
| JP | 2003-536153 A | 12/2003 |

OTHER PUBLICATIONS

Japanese Office Action (Notification of Reason(s) for Refusal dated Mar. 14, 2006 and an English-language abstract thereof.

(Continued)

*Primary Examiner*—Ulka Chauhan
*Assistant Examiner*—Robert Bader
(74) *Attorney, Agent, or Firm*—Katten Muchin Roseman LLP

(57) ABSTRACT

An image processing apparatus capable of efficient rendering is provided. In an image processing apparatus which renders, in a screen coordinate system, unit figures each constituting the surface of a three-dimensional object to be rendered, a rasterizing unit divides a rendering area corresponding to a screen into multiple unit areas, while a first unit figure is projected onto a screen coordinate system, and outputs the unit areas. A similar process is applied to second and subsequent unit figures so that the multiple unit areas constituting each unit figure are sequentially output. An area divider divides each of the unit areas sequentially output from the rasterizing unit into multiple subareas. An area discarder discards as necessary a subarea obtained by the division by the area divider according to a predetermined rule. An area writer re-merges subareas that survived the discarding process by the area discarder and writes merged areas obtained by re-merge in the memory.

13 Claims, 11 Drawing Sheets

OTHER PUBLICATIONS

Chinese First Office Action dated Oct. 31, 2008, from the corresponding Chinese Application.
International Preliminary Report on Patentability dated Aug. 28, 2007 from the corresponding PCT/JP2006/302518.
Chinese Second Office Action dated Nov. 27, 2009, from the corresponding Chinese Application.
Supplementary European Search Report dated Oct. 26, 2009, from the corresponding European Application.

* cited by examiner

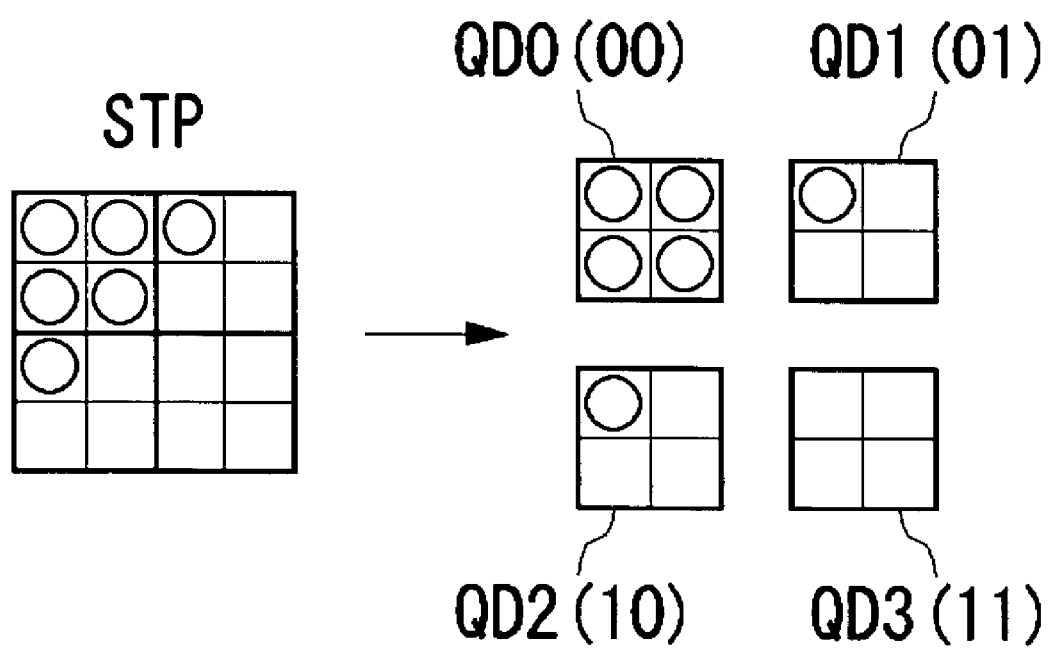

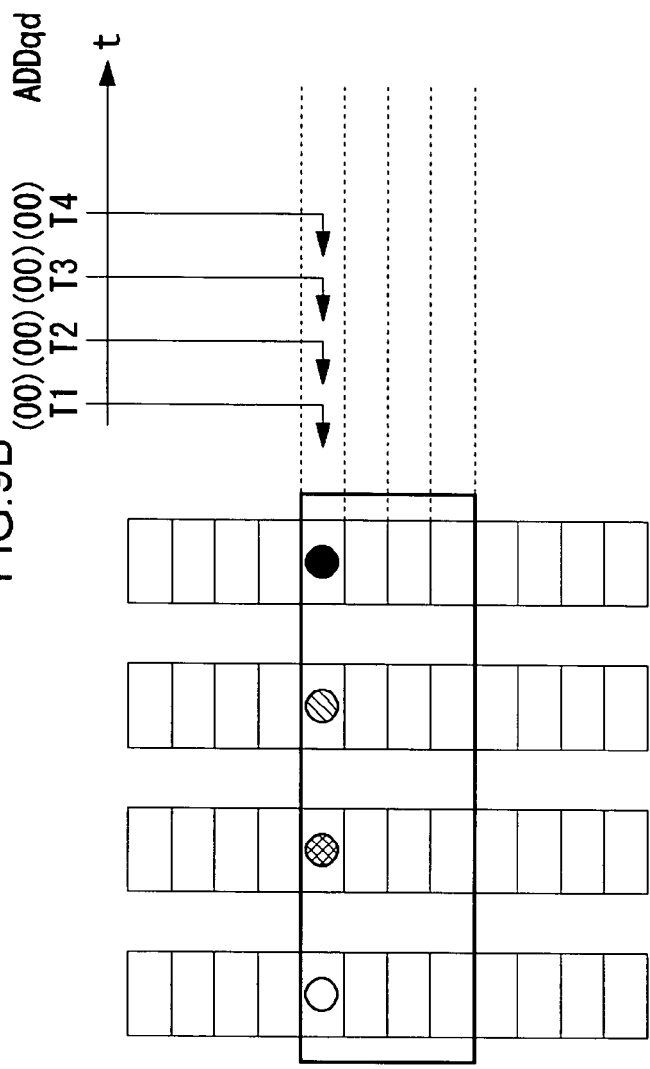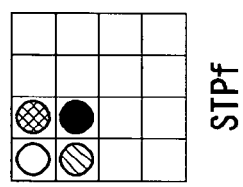

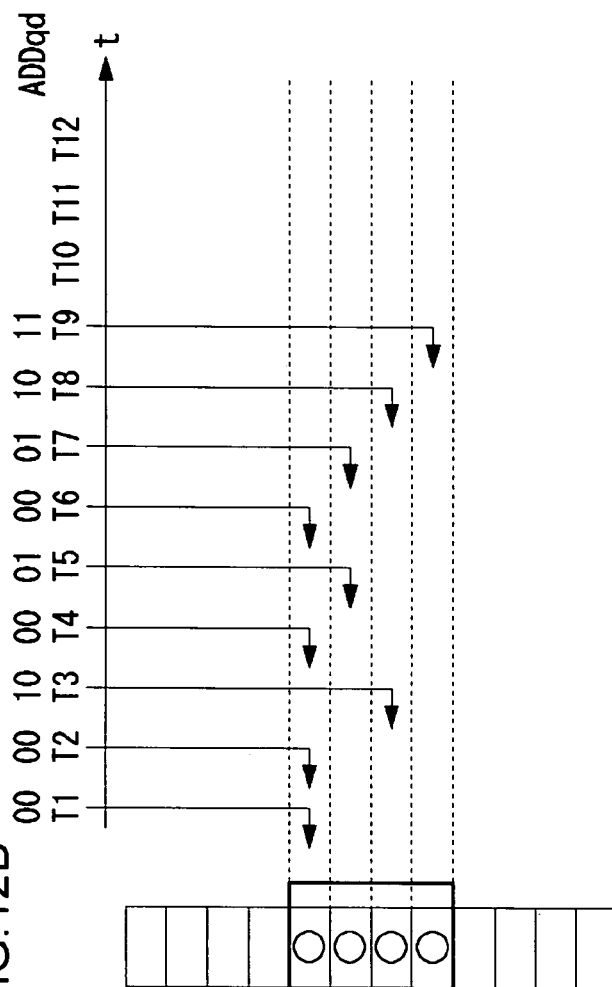
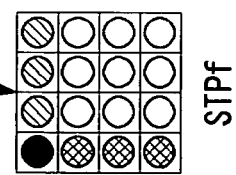

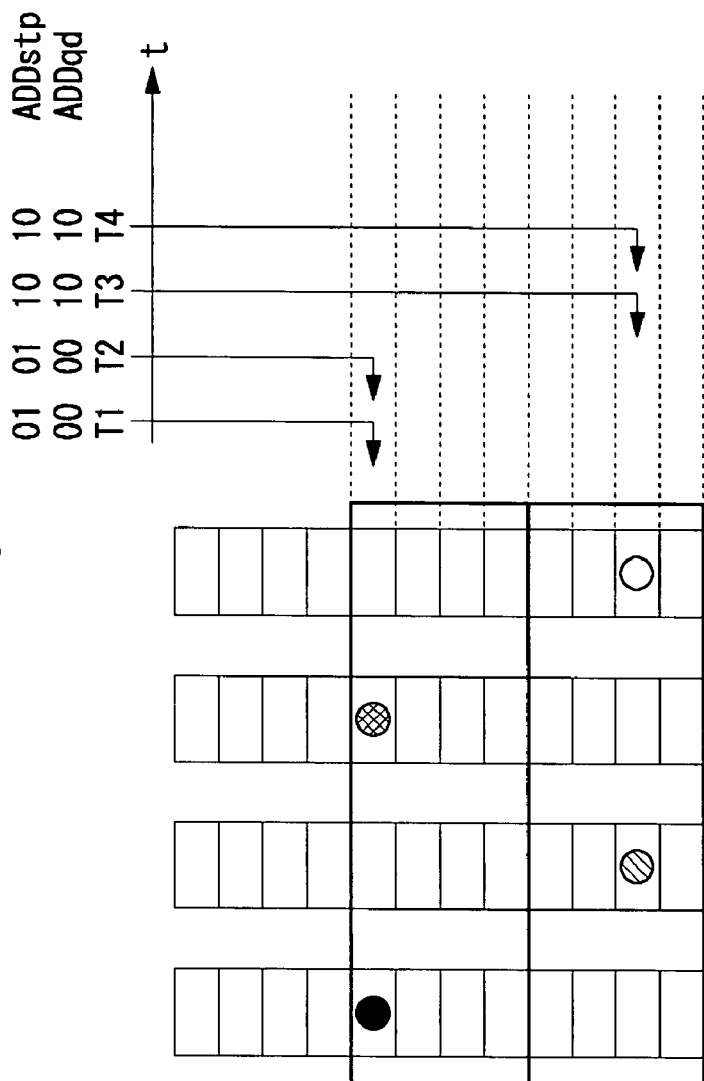
FIG.15A
FIG.15B
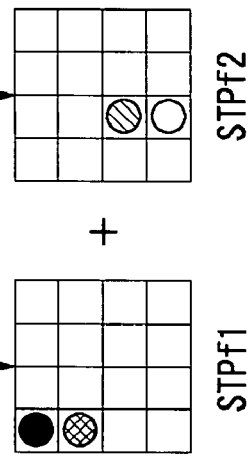
FIG.15C

IMAGE PROCESSING DEVICE AND IMAGE PROCESSING METHOD FOR RENDERING THREE-DIMENSIONAL OBJECTS

This application is a National Phase Application of International Application No. PCT/JP2006/302518, filed Feb. 14, 2006, which claims the benefit under 35 U.S.C. 119 (a-e) of Japanese Application No. 2005-047400 filed Feb. 23, 2005, which is herein incorporated by reference.

BACKGROUND OF THE INVENTION

1. Field of the Invention

The present invention relates to an image processing technology in a graphics processor or the like.

2. Description of the Related Art

With the remarkable development of computer graphics technology and image processing technology used in computer gaming, digital broadcast etc, in recent years, more detailed display of three-dimensional graphics etc. has become possible. In three-dimensional graphics processing, a three-dimensional object having three-dimensional coordinate data is projected onto a two-dimensional screen for display on a display or the like.

Normally, a three-dimensional object is modeled using a combination of polygons (e.g., triangles). In projecting a three-dimensional object onto a two-dimensional screen, rasterization is performed wherein values like luminance of pixels inside the polygons are calculated by referring to data on vertices of the polygons.

In rasterization, a linear interpolation method called Digital Differential Analyzer (DDA) is used. DDA allows obtaining gradient between data for a vertex of a polygon and data for another vertex of the polygon in the direction of a side of the polygon. The gradient thus obtained is used to compute data for the polygon sides. Subsequently, pixels inside the polygons are generated by computing the gradient in the raster-scan direction.

Patent document 1 discloses a technology for improving rendering speed whereby a pixel group comprising a plurality of pixels included in a predefined rectangular area is dealt with as a unit of processing and a set of pixel groups are transmitted to a processing block in the subsequent stage.

Patent document 2 teaches an improvement over the technology described in patent document 1. Processing efficiency is improved by merging multiple pixel groups into a single pixel group before transmitting the same to a processing block in the subsequent stage.

[patent document 1] JP 2000-338959 A
[patent document 2] JP 2003-123082 A

With improvements in the performance of image processing apparatuses for processing three-dimensional computer graphics in recent years, the size of a polygon forming a three-dimensional object tends to be smaller in order to render a more detailed three-dimensional object. Consequently, pixel groups including only a limited number of valid pixels are increasingly more likely to be generated. In this background, more efficient merge of rectangular areas (pixel groups) is called for.

SUMMARY OF THE INVENTION

A general purpose of the present invention in this background is to provide an image processing apparatus capable of achieving efficient image processing.

An embodiment of the present invention pertains to an image processing technology which renders, in a screen coordinate system, unit figures each constituting the surface of a three-dimensional object to be rendered. In this image processing technology, a unit figure is divided into multiple unit areas on a screen coordinate system so that the unit areas are output. Each of the output unit areas is divided into multiple subareas. Selected ones of the multiple subareas are discarded according to a predetermined rule. Rendering is performed on subareas that survived the discarding process.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 shows how a stamp is divided into quads.
FIGS. 9A-9C show how the area writer writes a merged stamp into a cache memory.
FIGS. 12A-12C show how the area writer writes merged stamps shown in FIG. 10 into the cache memory.
FIGS. 15A-15C show how the area writer writes a merged stamp of FIG. 13 into the cache memory 50.

DETAILED DESCRIPTION OF THE INVENTION

Figure 1:
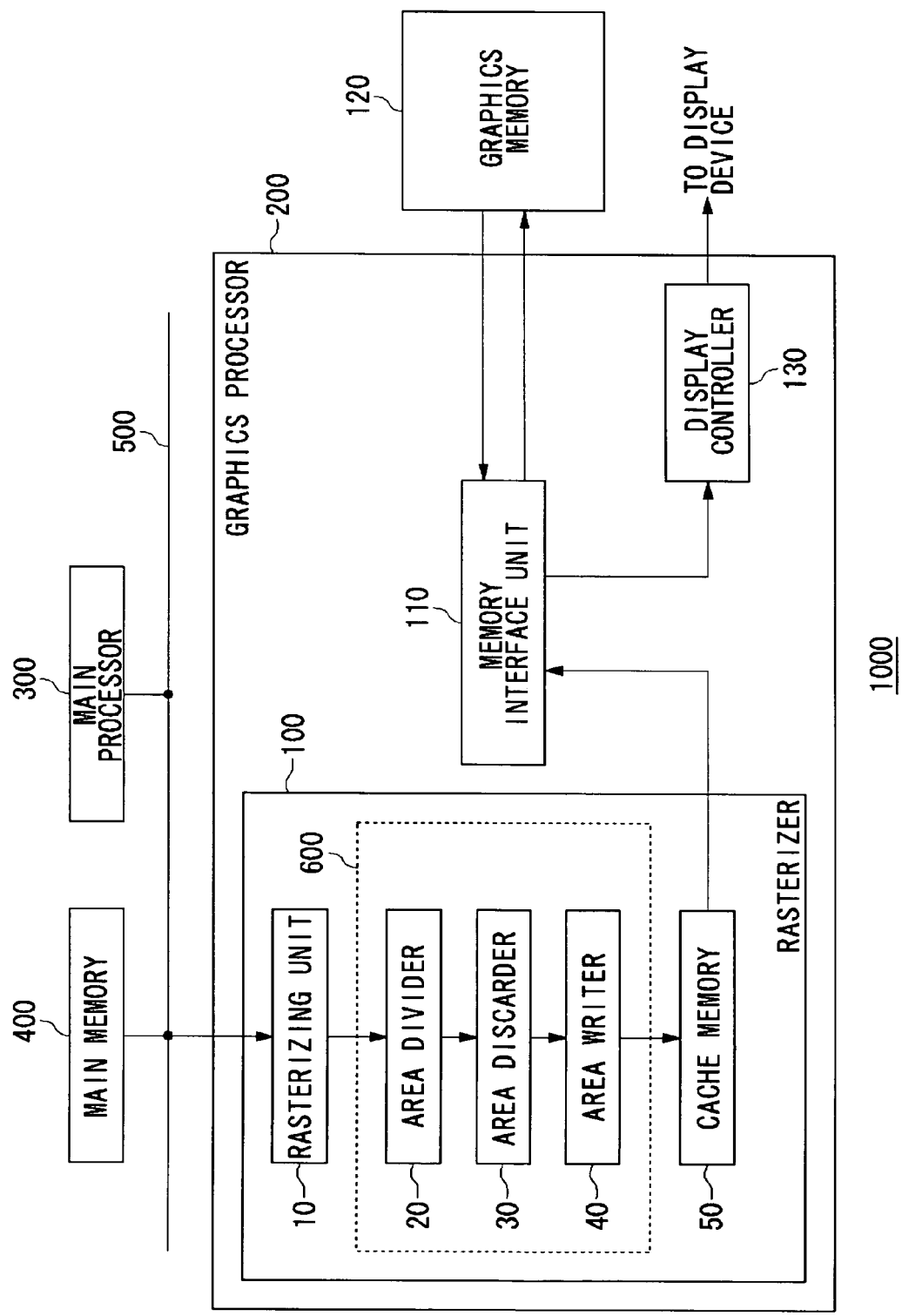
FIG. 1 shows the structure of an image processing apparatus according to a first embodiment.

The invention will now be described based on preferred embodiments which do not intend to limit the scope of the present invention but exemplify the invention. All of the features and the combinations thereof described in the embodiment are not necessarily essential to the invention.

Before giving a specific description of embodiments, a summary of the embodiments will be given.

An embodiment of the present invention relates to an image processing apparatus which renders, in a screen coordinate system, unit figures each constituting the surface of a three-dimensional object to be rendered, comprises a rasterizing unit which divides a unit figure into a plurality of unit areas on the screen coordinate system and outputs the unit areas; an area divider which divides each of the unit areas output from the rasterizing unit into a plurality of subareas; an area discarder which discards as necessary a subarea obtained by the division by the area divider according to a predetermined rule; and an area writer which writes a subarea that survived the discarding process by the area discarder into a memory.

According to this embodiment, the number of subareas transmitted to a subsequent stage can be reduced for efficient rendering, by dividing each of the unit areas into the subareas and discarding unnecessary subareas. A unit figure is a polygon or a curved surface patch, by way of examples.

The area writer may re-merge subareas that survived the discarding process and writes merged areas obtained by re-merge in the memory.

Of the subareas that survived the discarding process by the area discarder, the area writer may merge subareas derived from unit areas having the same coordinates in the screen coordinate system before the division.

In this case, it is ensured that the subareas included in a merged area obtained as a result of re-merge are all derived from the unit areas at the same position. This eliminates the need to refer to the coordinate of the unit area originating each subarea, in writing data related to the merged area into the memory.

The merged area may have the same size as the unit area. In this case, output data from the rasterizing unit is of the same size as output data from the area writer. By ensuring that a unit throughput in the rasterizing unit is equal to a unit throughput in writing into the memory, hardware and software can be designed flexibly and compatibility with existing systems is enhanced.

The size of the subarea may correspond to a unit throughput in which the area writer writes the subareas into the memory at a time.

The area writer may refer to information indicating the relative position of a subarea in the unit area to which the subarea belonged before the division and write the subarea in an address in the memory corresponding to the information.

The unit area may be a rectangular area, the rasterizing unit may divide a rendering area so that each of the plurality of unit areas includes a pixel group, the pixel number in the vertical direction and the pixel number in the horizontal direction of a pixel group in a given unit area being identical with the corresponding numbers of a pixel group in another unit area, and the area divider may divide the unit area including the pixel group into a plurality of subareas each including a small pixel group, the pixel number in the vertical direction and the pixel number in the horizontal direction of a pixel group in a given unit area being identical with the corresponding numbers of a pixel group in another unit area.

Of the plurality of subareas obtained by the division by the area divider, the area discarder may discard a subarea that does not include any valid pixels. The term "valid pixel" means a pixel which represents an area embraced by a unit figure whose luminance value, and/or fog value etc. had been generated by the rasterizing unit.

By discarding subareas that do not include any valid pixels, frequency of treating invalid pixels in a processing unit in a subsequent stage is reduced so that efficient rendering is achieved.

Of the subareas that survived the discarding process by the area discarder, the area writer may re-merge subareas which do not include valid pixels at identical coordinates in the screen coordinate system and may write subareas into the memory in units of merged areas obtained by re-merge.

By eliminating from re-merge those subareas that have valid pixels at identical coordinate in the screen coordinate system, loss of information due to overlapping of valid pixels is successfully prevented.

Of the subareas that survived the discarding process by the area discarder, the area writer may merge subareas derived from unit areas having the same coordinates in the screen coordinate system before the division.

In this case, it is ensured that the subareas included in a merged area obtained as a result of re-merge are all derived from the unit areas at the same position. This eliminates the need to refer to the coordinate position of the unit area originating each subarea, in writing data related to the merged area into the memory.

The area writer may refer to information indicating the relative position of a subarea in the unit area to which the subarea belonged before the division so as to write the subarea in an address in the memory corresponding to the information.

Even if the information indicating the relative position of the subarea changes as a result of re-merge, the subarea can be written in a proper address by referring to the information indicating the relative position of the subarea in the originating unit area.

The area writer may comprise a memory access unit which writes pixels included in the subarea into the memory in parallel.

Another embodiment of the present invention relates to an image processing method. The image processing method which renders, in a screen coordinate system, unit figures each constituting the surface of a three-dimensional object to be rendered, comprises: rasterizing by dividing a unit figure into a plurality of unit areas on the screen coordinate system and outputting the unit areas; dividing each of the unit areas output from the rasterizing into a plurality of subareas; discarding as necessary a subarea obtained by dividing the unit area according to a predetermined rule; and writing a subarea that survived the discarding into a memory.

The rasterizing may divide a rendering area so that each of the plurality of unit areas includes a pixel group, the pixel number in the vertical direction and the pixel number in the horizontal direction of a pixel group in a given unit area being identical with the corresponding numbers of a pixel group in another unit area, and the unit area dividing may divide the unit area including the pixel group into a plurality of subareas each including a small pixel group, the pixel number in the vertical direction and the pixel number in the horizontal direction of a pixel group in a given subarea being identical with the corresponding numbers of a pixel group in another subarea.

Of the plurality of subareas obtained by the division, the discarding may discard a subarea that does not include any valid pixels.

Still another embodiment of the present invention relates to a rendering method. The rendering method which renders, in a screen coordinate system, unit figures each constituting the surface of a three-dimensional object to be rendered, comprises: dividing a unit figure into a plurality of unit areas on the screen coordinate system and outputting the unit areas; and generating merged areas by retrieving, from a plurality of subareas constituting each of the unit areas output from the dividing, subareas that include valid pixels.

Another rendering method which renders, in a screen coordinate system, unit figure each constituting the surface of a three-dimensional object to be rendered, comprises: dividing a unit figure into a plurality of unit areas on the screen coordinate system and outputting the unit areas; and writing subareas, of a plurality of subareas constituting each of the unit areas output from the dividing, that include valid pixels into a memory in parallel.

Yet another embodiment of the present invention relates to a computer program product. The computer program product which renders, in a screen coordinate system, unit figures each constituting the surface of a three-dimensional object to be rendered, comprises: a dividing module which causes a computer to divide a unit figure into a plurality of unit areas on the screen coordinate system and outputting the unit areas;

and a merging module which causes a computer to retrieve, from a plurality of subareas constituting each of the unit areas output from the dividing, subareas that include valid pixels so as to generate merged areas.

Another computer program product which renders, in a screen coordinate system, unit figures each constituting the surface of a three-dimensional object to be rendered, comprises: a dividing module which causes a computer to divide a unit figure into a plurality of unit areas on the screen coordinate system and outputting the unit areas; and a writing module which causes a computer to write subareas, of a plurality of subareas constituting each of the unit areas output from the dividing, that include valid pixels into a memory in parallel.

Still another embodiment of the present invention relates to an image processing apparatus which renders, in a screen coordinate system, unit figures each constituting the surface of a three-dimensional object to be rendered. The image processing apparatus comprises: a rasterizing unit which divides a rendering area corresponding to a screen into multiple unit areas, while a unit figure is projected onto a screen coordinate system, and subjects a second and subsequent unit figures to a similar process so as to sequentially output a plurality of unit areas constituting each unit figure; an area divider which divides each of the unit areas sequentially output from the rasterizing unit into multiple subareas; an area discarder which discards as necessary a subarea obtained by the division by the area divider according to a predetermined rule; and an area writer which writes a subarea that survived the discarding process in a memory.

Yet another embodiment of the present invention relates to an image processing method which renders, in a screen coordinate system, unit figures each constituting the surface of a three-dimensional object to be rendered. The image processing method comprises: rasterizing by dividing a rendering area corresponding to a screen into multiple congruent unit areas, while a first unit figure is projected onto a screen coordinate system, and subjecting a second and subsequent unit figures to a similar process so as to sequentially output a plurality of unit areas constituting each unit figure; dividing each of the unit areas sequentially output into multiple subareas; discarding as necessary a subarea obtained by the dividing the unit area according to a predetermined rule; and writing a subarea that survived the discarding in a memory.

Still another embodiment of the present invention relates to a computer program product. The computer program, adapted to an image processing apparatus which renders, in a screen coordinate system, unit figures each constituting the surface of a three-dimensional object to be rendered, comprises: rasterizing by causing a computer to divide a rendering area corresponding to a screen into multiple unit areas, while a first unit figure is projected onto a screen coordinate system, and to subject a second and subsequent unit figures to a similar process so as to sequentially generate a plurality of unit areas constituting each unit figure; and dividing each of the unit areas sequentially generated in the rasterizing into multiple subareas; discarding as necessary a subarea obtained by the dividing according to a predetermined rule; and writing a subarea that survived the discarding in a memory.

Optional combinations of the aforementioned constituting elements, and implementations of the invention in the form of methods, apparatuses, systems programs may also be practiced as additional modes of the present invention.

Several modes of the present invention will be described in detail based upon embodiments.

First Embodiment

FIG. 1 shows the structure of an image processing apparatus according to a first embodiment. An image processing apparatus 1000 performs image processing such as three-dimensional computer graphics processing. The image processing apparatus 1000 projects a unit figure (or unit graphic form) constituting the surface of an object to be rendered onto a rendering area in a screen coordinate system and generates pixels so as to render the object, which is ultimately displayed on a display.

The information processing apparatus 1000 comprises a graphics processor 200, a main processor 300, a main memory 400 and a graphics memory 120. The blocks are connected to each other via a bus 500.

The information processing apparatus 1000 is connected to a display apparatus (not shown) which outputs images and graphics generated by the image processing apparatus 1000. The elements illustrated in FIG. 1 and subsequent drawings as functional blocks executing respective processes are implemented by hardware including a CPU, a memory and an LSI and by software including a program provided with reservation and management functions and loaded into the memory. Therefore, it will be obvious to those skilled in the art that the function blocks may be implemented by a variety of non-limiting manners including hardware only, software only or a combination of both.

The main processor 300 performs an operation such as three-dimensional computer graphics modeling. The main memory 400 is a storage area primarily used by the main processor 300. For example, modeling data obtained by processing a task related to computer graphics in the main processor 300 is temporarily stored in the main memory 400.

The graphics memory 120 is a memory area dedicated to graphic-related data used and managed by the graphics processor 200. In addition to a frame buffer and a z buffer for storing image frame data, the graphics memory 120 further comprises areas respectively corresponding to vertex data, texture data and a color look-up table, which are basic data referred to when rendering image frame data.

The graphics processor 200 is a block dedicated to the execution of an image. The graphics processor 200 performs a series of steps of rendering in which it reads from the main memory 400 three-dimensional modeling data generated by the main processor 300 and generates image frame data by performing coordinate transform, hidden surface elimination, shading etc.

The graphics processor 200 includes a rasterizer 100, a memory interface unit 110 and a display controller 130.

The rasterizer 100 reads three-dimensional modeling data from the main memory 400 so as to acquire vertex data of a primitive to be rendered. The rasterizer 100 performs a view transform in which a primitive in a three-dimensional space is transformed by projecting the primitive onto a screen coordinate system into a figure on a rendering plane. Further, the rasterizer 100 performs a rasterizing process in which the figure on the rendering plane is scanned in the horizontal direction of the rendering plane so as to transform, row by row, the figure into quantized pixels. The rasterizer 100 decomposes the primitive into pixels and computes pixel information for each pixel. The pixel information includes RGB color values, an a value indicating transparency and a Z value indicating depth from a view point.

The rasterizer 100 generates a pixel area of a predetermined size along the scan line and outputs the generated area to the memory interface unit 110. A pixel group output from the rasterizer 100 is temporarily stacked in a queue. The memory interface unit 110 sequentially writes pixel groups stacked in the queue to the graphics memory 120.

The memory interface 110 writes pixels in the graphics memory 120 or reads a frame buffer from the graphics memory 120 in accordance with an instruction from the display controller 130. The display controller 130 outputs image data read from the graphics memory 120 to the display device.

A detailed description will now be given of the structure and operation of the rasterizer 100.

The rasterizer 100 includes a rasterizing unit 10, a merger 600 and a cache memory 50.

The rasterizing unit 10 projects a triangle (a unit figure constituting the surface of an object rendered) onto a rendering area in a screen coordinate system. The rasterizing unit 10 divides the rendering area into multiple unit areas, generates pixels included in the unit areas and outputs pixel groups for each of the respective unit areas. The rasterizing unit 10 sequentially generates pixel groups for the respective unit areas for output, repeating the step of generation for multiple unit figures (triangles).

Figure 2:
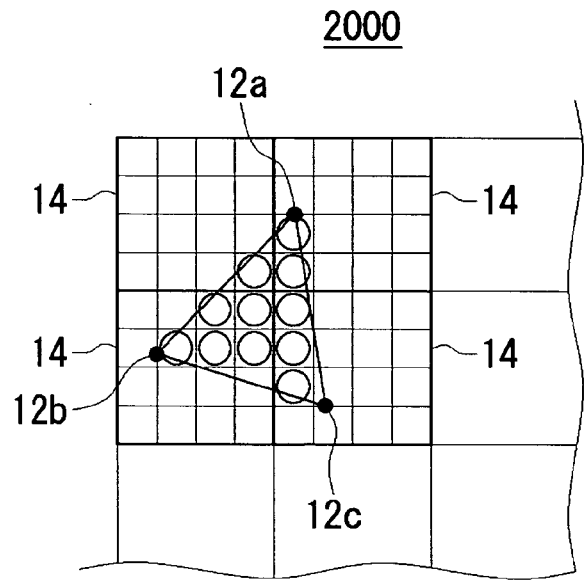
FIG. 2 shows how pixels are generated by a rasterizing unit.

FIG. 2 shows how pixels are generated by the rasterizing unit 10. FIG. 2 shows a part of a rendering area 2000 in a screen coordinate system. A triangle 12 is a projection of a triangle (a unit figure constituting the surface of a three-dimensional object) onto a rendering area. The rasterizing unit 10 generates pixels inside the polygon by using the Digital Differential Analyze (DDA) method, based upon the coordinate values, colors, fog values and texture coordinates of three vertices 12a, 12b and 12c of the triangle 12.

The rendering area is divided into multiple congruent unit areas 14.

The rasterizing unit 10 sequentially generates, for each unit area, pixel information (color, fog value etc.) for an area embraced by the triangle 12 and outputs the pixel information thus generated for the respective unit areas. Hereinafter, pixels for which pixel information is generated by the rasterizing unit 10 will be referred to as valid pixels.

In this embodiment, the unit area 14 having a predetermined size includes 4×4 pixels. The 4×4 pixel group included in the unit area 14 will be referred to as a stamp STP. Each stamp STP maintains position information indicating the position of the associated unit area in the screen coordinate system. Hereinafter, the position information of a stamp will be referred to as a stamp address ADDstp.

The rasterizing unit 10 sequentially generates pixel information for each of the stamps STP and sequentially outputs stamps STP that include valid pixels to the merger 600.

The merger 600 merges multiple stamps STP output from the rasterizing unit 10 and writes each of the stamps thus merged in the cache memory 50 in the subsequent stage. A stamp obtained by merging the multiple stamps STP in the merger 600 will be referred to as a final stamp STPf. The rasterizer 100 and the memory interface unit 110 inside the graphics processor exchange data with each other, using a stamp STP as a unit of processing.

Merge performed in the merger 600 will be described. The merger 600 merges stamps having the identical stamp address ADDstp.

Figure 3A:
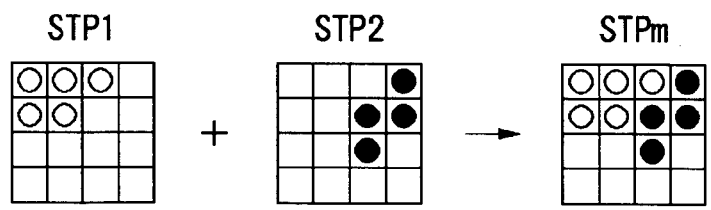
FIGS. 3A-3C show how multiple stamps are merged under different conditions.
Figure 3B:
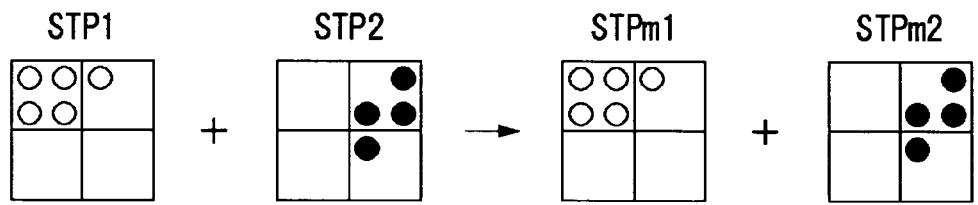
Figure 3C:
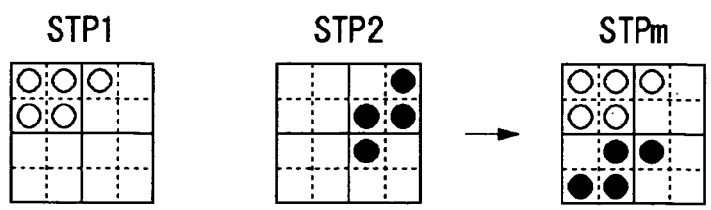

Merge of the stamps is performed using the following two parameters. A first parameter represents the size of a unit referred to for determination as to whether merge is possible. A second parameter represents the size of a unit of actual merge. FIGS. 3A-3C show how multiple stamps are merged under different conditions. A stamp STPm represents a merged stamp STPm obtained by merging two stamps STP1 and STP2.

Hereinafter, a small pixel group comprising 2×2 pixels obtained by dividing a stamp will be referred to as a quad QD. A quad that includes a valid pixel will be referred to as a valid quad.

FIG. 3A shows merge performed when both two parameters are "pixels". The stamp STP1 and the stamp STP2 of FIG. 3A have the identical stamp address. These stamps STP do not include valid pixels that occur at identical positions. Therefore, upon pixel-by-pixel determination on overlapping (occurrence at identical positions), the stamps will be merged without any problem.

FIG. 3B shows merge performed when both two parameters are "quads (QD)". In merge shown in FIG. 3B, a determination on occurrence at identical positions is made quad by quad. As a result, quads at top right of the stamp STP1 and the stamp STP2 are both valid and occur at identical positions. Therefore, the two stamps are not merged. The two stamps STP1 and STP2 are output unmodified.

FIG. 3C shows merge according to this embodiment, wherein the first parameter is "pixel" and the second parameter is "quad (QD)". In merge of FIG. 3C, a determination on occurrence at identical positions is made pixel by pixel. It is found that quads QD at top right of the stamp STP1 and the stamp STP2 are both valid and occur at identical positions, but valid pixels are not to found to overlap each other upon pixel-by-pixel determination. Additionally, the total number of valid quads is 4 or fewer. Thus, the stamps can be merged into a single stamp STPm. In the merged stamp STPm obtained as a result of quad-based merge, the position of a quad may be different from the original position. This is addressed by relocation described later.

As described, in the merge according to this embodiment shown in FIG. 3C, determination on occurrence at identical positions is made pixel by pixel and merge is performed quad by quad. As a result, efficiency in merging the stamp STP1 and the stamp STP2 shown in FIG. 3C is equal to that of FIG. 3A. When implemented in actual image processing, efficiency in merge is most superior in FIG. 3A, followed by FIG. 3C and FIG. 3B.

Considering the cost required to implement an image processing apparatus for performing such merge, reduction in the size defined by the first parameter, which represents a unit referred to for determination of the possibility of merge, will only require a change in the unit of determination. As such, it does not result in a considerable increase in implementation cost. In contrast, reduction in the size defined by the second parameter, which represents a unit of actual merge, will require increased cost for implementing a unit for accessing a memory. Thus, in terms of implementation cost, the arrangement of FIG. 3B is most favorable, followed by FIG. 3C and FIG. 3A.

Therefore, the method of merge according to this embodiment shown in FIG. 3C is superior in balance between efficiency in merge and implementation cost. A description will now be given of the structure of the merger 600 for achieving the merge according to this embodiment.

The merger 600 includes an area divider 20, an area discarder 30 and an area writer 40.

The area divider 20 divides stamps STP sequentially output from the rasterizing unit 10 into multiple small congruent small pixel groups. In this embodiment, the area divider 20 divides a stamp STP of 4×4 pixels into congruent quads QD0-QD3 of 2×2 pixels and outputs the quads to the area discarder 30 in the subsequent stage.

FIG. 4 shows how the stamp STP is divided into the quads QD0-QD3. Each of the quads QD0-QD3 maintains position information indicating the relative position of the quads in the stamp, as a quad address ADDqd. It will be assumed that the quad addresses ADDqd are 00, 01, 10 and 11, starting with the top left quad and ending with the bottom right quad. In FIG. 4, the quad addresses are parenthesized.

The area divider 20 outputs multiple pixels in units of quads QD to the area discarder 30 in the subsequent stage.

The area discarder 30 retains selected quads QD selected from the multiple quads QD output from the area divider 20 and discards the rest. The area discarder 30 outputs the quads QD that survived the discarding process to the area writer 40 in the subsequent stage.

The area writer 40 writes the quads QD that survived the discarding process by the area discarder 30 to the cache memory 50. In this process, the quads that survived the discarding process by the area discarder 30 are re-merged and are used to reconstruct a stamp comprising 4×4 pixels. A stamp re-merged by the area writer 40 will be referred to as a merged stamp STPm.

The area writer 40 writes the merged stamp STPm output from the area discarder 30 in the cache memory 50 as a unit of processing. The merged stamp STPm written in the cache memory 50 is stacked in a queue. The memory interface 110 sequentially writes the merged stamp STPm thus stacked into the graphics memory 120. Since the merged stamp STPm is not necessarily identical with the final stamp STPf, the area writer 40 relocates quads within the merged stamp STPm as described later.

A detailed description of processes in the area divider 20, the area discarder 30 and the aera writer 40 will now be given.

Of those stamps STP sequentially output from the rasterizing unit 10, stamps that are targets of division by the area divider 20 will be referred to as source stamps STPs. A stamp which is obtained by sequentially and temporarily dividing source stamps STPs into quads, discarding unnecessary quads QD and re-merging stamps will be referred to as a merged stamp STPm. A stamp used in the process of merging source stamps STPs and maintained to be subject to merge will be referred to as a target stamp STPt.

The merger 600 merges by sequentially writing quads QDs of the source stamps STPs into empty quads of the target stamp STPt.

Figure 5:
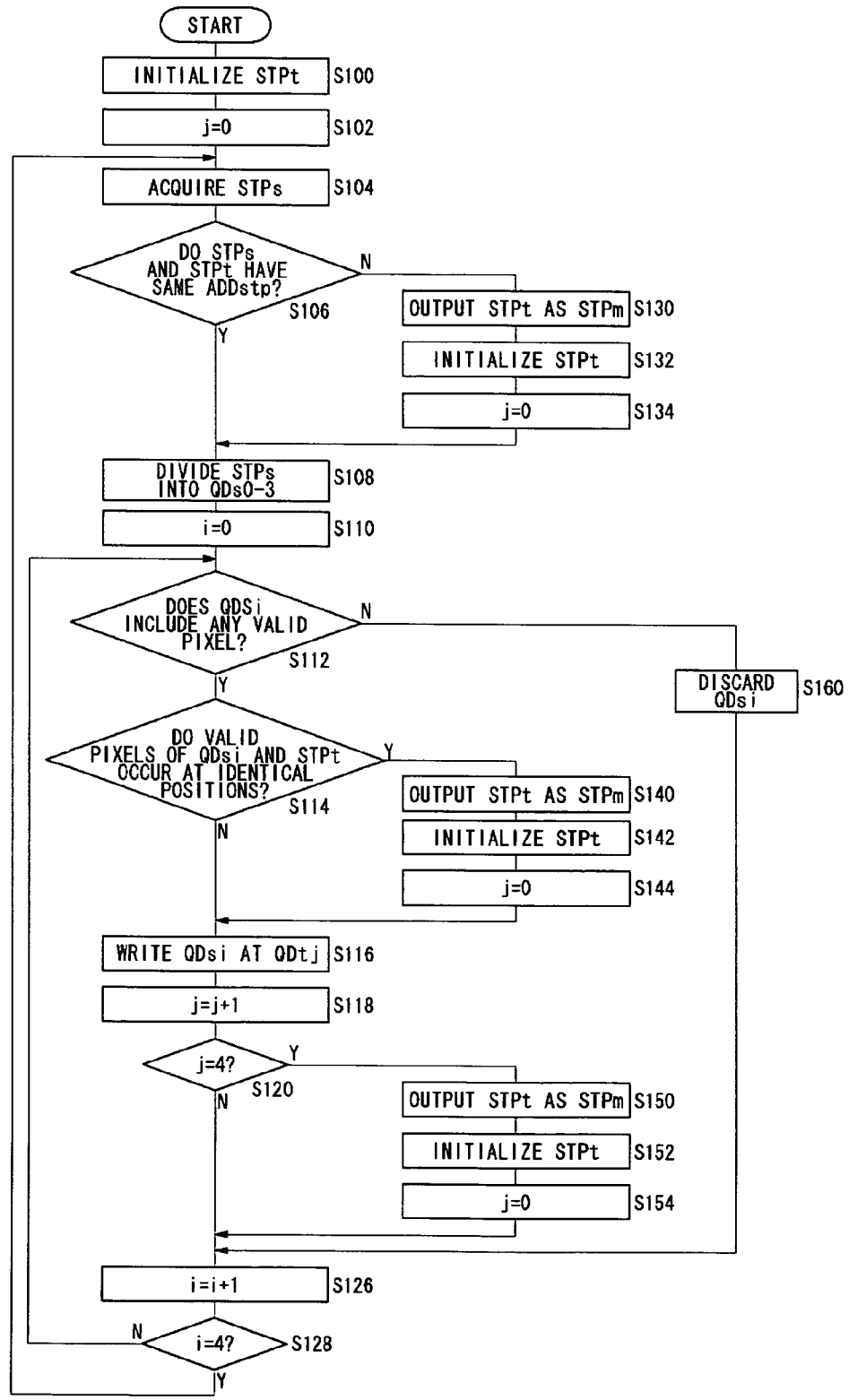
FIG. 5 is a flowchart showing how stamps are merged in a merger according to the first embodiment.

FIG. 5 is a flowchart showing how stamps STP are merged in the merger 600 according to this embodiment.

Prior to starting a merge process, the area writer 40 initializes a target stamp STPt (S100).

The area writer 40 then initializes a variable j to 0 (S102). The variable j indicates the place, in the sequence of quads in the target stamp STPt, up to which the quad is valid. For example, if j=0, it indicates that no valid quad is written in the target stamp STPt. If j=4, it indicates that the target stamp STPt is filled with quads.

The area divider 20 then acquires a source stamp STPs (S104). Acquiring of a source stamp STPs is achieved by reading a stamp STP output from the rasterizing unit 10.

The stamp address ADDstp of the target stamp STPt and that of the source stamp STPs are then compared (S106). If the addresses of the two stamps differ (N in S106), merge is not performed and the current target stamp STPt is output to the area writer 40 in the subsequent stage as a merged stamp STPm (S130). The target stamp STPt is then initialized (S132). In association with the initialization of the target stamp STPt, the variable j is set to 0 (S134). Control is then returned to S108.

If the addresses of the two stamps are identical (Y in S106), the area divider 20 divides the source stamp STPs into four quads QDs0-QDs3 (S108).

A variable i is then initialized to 0 (S10). The variable i indicates where, in the sequence of quads in the source stamp STPs subject to merge, the quad being processed is positioned. For example, if i=0, the quad QDs0 of the source stamp STPs is being processed.

The area discarder 30 then determines whether the ith quad QDsi of the source stamp STPs includes any valid pixel (S112). If the quad QDsi does not include any valid pixel (N in S112), the quad QDsi is discarded (S160). The variable i is incremented by 1 to proceed to the next quad QDsi (S126).

If the quad QDsi includes a valid pixel (Y in S112), the area writer 40 determines whether any of the valid pixels in the quad QDsi occurs at the identical position as a valid pixel of the target stamp STPt (S114). The determination is made by determining whether the quad QDsi and the target stamp STPt include valid pixels at the same coordinate position in the screen coordinate system.

If there are valid pixels occurring at identical positions (Y in S114), merge is not performed and the current target stamp STPt is output as a merge stamp STPm. The target stamp STPt is initialized and the variable j is returned to 0 (S140-S144). Control then proceeds to the merge process described below (S116-S128).

If there are no valid pixels occurring at identical positions (N in S114), control also proceeds to the merge process described below (S116-S128).

The quad QDsi of the source stamp STPs is written in the jth quad QDtj of the target stamp STPt (S116). The variable j is then incremented by 1 in order to shift the position of writing in the target stamp STPt (S118).

If j=4, it means that the quads QDs of the source stamps are merged with all quads QDt0-QDt3 of the target stamp STPt. Therefore, the current target stamp STPt is output as a merged stamp STPm (S150). The target stamp STPt is then initialized (S152) and the variable j is set to 0 (S154). The variable i is incremented by 1 to proceed to the next quad QDsi (S126).

If j≠4, it means that there is an empty quad in the target stamp STPt. The target stamp STPt is maintained as it is and the variable i is incremented by 1 to proceed to the next quad QDsi (S126).

A determination on the variable i is made. If i=4 (Y in S128), it means that merge is completed for all quads QDsi belonging to the source stamp STPs. Thereupon, the next source stamp STPs is acquired (S104).

If i≠4, control is returned to S112 to proceed to the next quad QDsi.

As described, the merger 600 merges if the stamp addresses of the target stamp STPt and that of the source stamp STPm are identical and if there are no valid pixels occurring at identical pixel positions.

Figure 6:
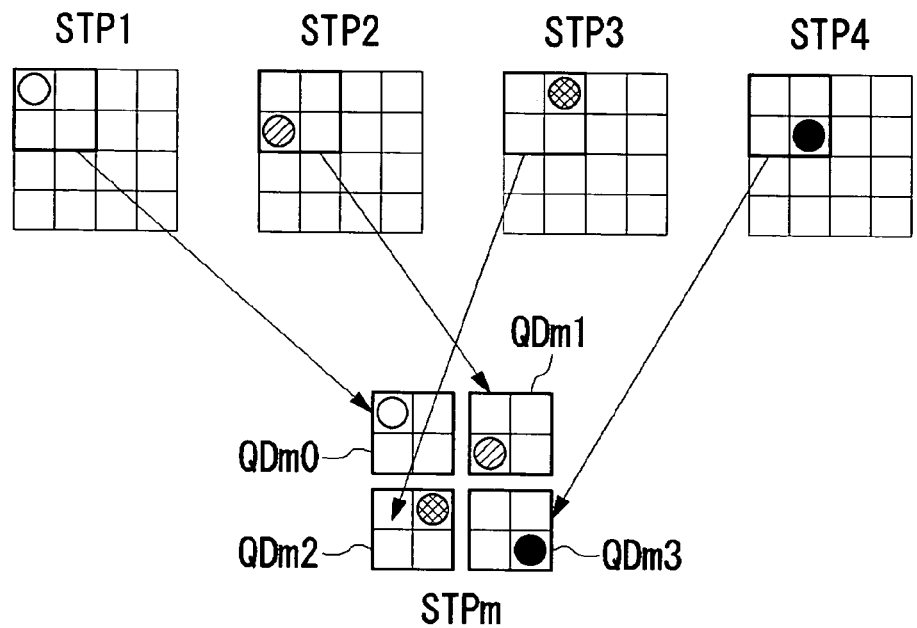
FIG. 6 shows how stamps are merged according to the flowchart shown in FIG. 5.

FIG. 6 shows how stamps are merged according to the flowchart shown in FIG. 5. We consider a case where the stamps STP1-STP4 are sequentially input to the area divider 20. It will be assumed that the target stamp STPt is empty.

The stamp STP1 will be the source stamp STPs and is divided by the area divider 20 into the four quads QDs0-QDs3. Since the quads QDs1-QDs3 do not include any valid pixel, they are discarded by the area discarder 30.

Only the quad QDs0 that survived the discarding process by the area discarder 30 is output to the area writer 40 and is written in the quad QDt0 of the target stamp STPt.

Subsequently, the stamp STP2 will be the source stamp STPs and is divided by the area divider 20 into the four quads QDs0-QDs3. The area discarder 30 discards the quads QDs1-

QDs3. The area writer 40 writes the quad QDs0 in the quad QDt1 of the target stamp STPt.

A similar process is performed for the stamps STP2 and STP3. Quads QD0 having the quad address ADDqd of (00) and derived from the stamps STP1-STP4 are written in the quads QDt0-QDt3 of the target stamp STPt so as to generate a merged stamp STPm.

The quads QDm0-QDm3 included in the merged stamp STPm maintain their quad addresses in the originating stamps STP1-STP4 as position information. The merged stamp STPm is output to the area writer 40 along with the position information.

Figure 7:
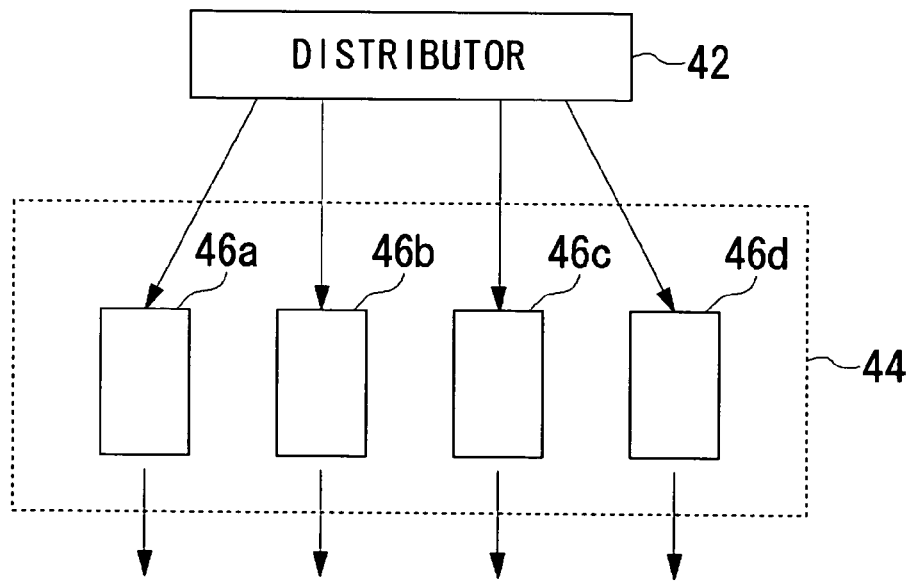
FIG. 7 shows the structure of an area writer.

FIG. 7 shows the structure of the area writer 40.

The area writer 40 includes a memory access unit 44 and a distributor 42. The memory access unit 44 is provided with output units 46a-46d for simultaneously writing four pixels included in a quad into the cache memory 50 in parallel.

The distributor 42 distributes pixels constituting a quad QD to the output units 46a-46d. The top left pixel in a quad is distributed to the output unit 46a, the top right pixel to the output unit 46b, the bottom left pixel to the output unit 46c, and the bottom right pixel to the output unit 46d.

By repeating the operation of simultaneously writing the four pixels into the cache memory 50 in parallel four times in units of quads, the area writer 40 completes a process of writing into one merged stamp.

Figure 8:
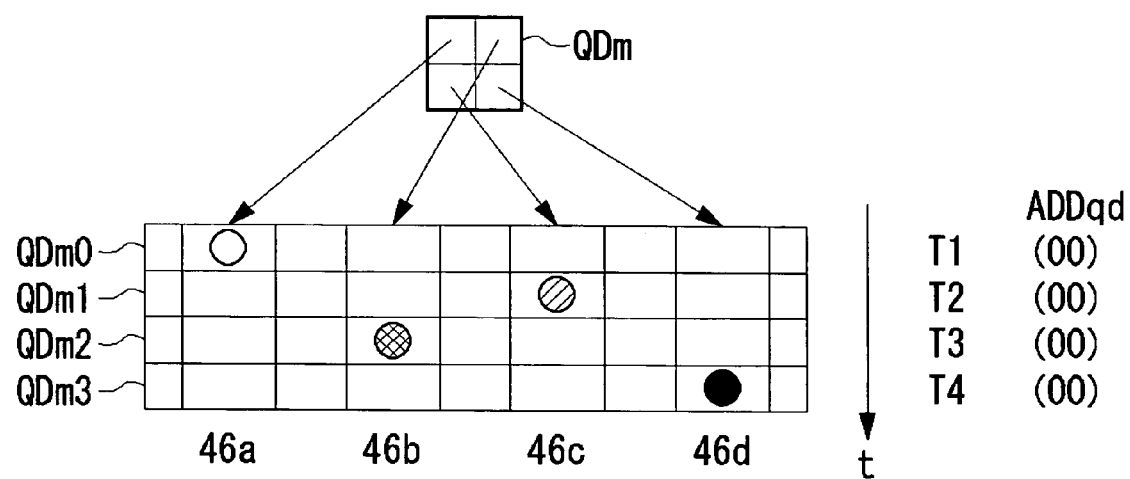
FIG. 8 shows how quads are distributed by the area writer to output units.

FIG. 8 shows how the quads QDm0-QDm3 are distributed by the area writer 40 to the output units 46a-46d. The distributor 42 divides the merged stamp STPm into the four quads QDm0-QDm3 and sequentially distributes them to the output units 46a-46d at times T1, T2, T3 and T4.

At time T1, the distributor 42 decomposes the quad QDm0 into pixels and distributes the pixels to the four output units 46a-46d. Each output unit writes the pixel derived from decomposition into the cache memory 50. Subsequently, the quads QDm1-QDm3 are decomposed into pixels at times T2, T3 and T4 and are sequentially output. An output of a merged stamp STPm is produced in each unit period comprising times T1-T4.

FIGS. 9A-9C show how the area writer 40 writes the merged stamp STPm into the cache memory 50. FIG. 9A shows the cache memory 50; FIG. 9B shows how writing of quads by the area writer 40 proceeds; and FIG. 9C shows the final stamp STPf obtained upon completion of the writing.

Since the merged stamp STPm is not necessarily identical with the final stamp STPf, the area writer 40 relocates quads within the merged stamp STPm.

The relocation is done as described below.

At time T1, the area writer 40 writes pixels included in the quad QDm0 of the merged stamp STPm into the cache memory 50. The area writer 40 refers to the quad address ADDqd of the quad QDm0. Since the quad address ADDqd of the quad QDm0 is 00, the quad QDm0 is written in an address 00 of the cache memory 50.

Subsequently, the quad QDm1 is written at time T2. Since the quad address of the quad QDm1 is also 00, the quad QDm1 is also written in the address 00 of the cache memory 50. Similarly, the quads QDm2 and QDm3 are written in the address 00 at times T3 and T4, respectively.

As a result of all quads QDm0-QDm3 being written in the quad address ADDqd=00, the final stamp STPf in which the stamps STP1-STP4 of FIG. 6 are merged is generated.

Figure 10:
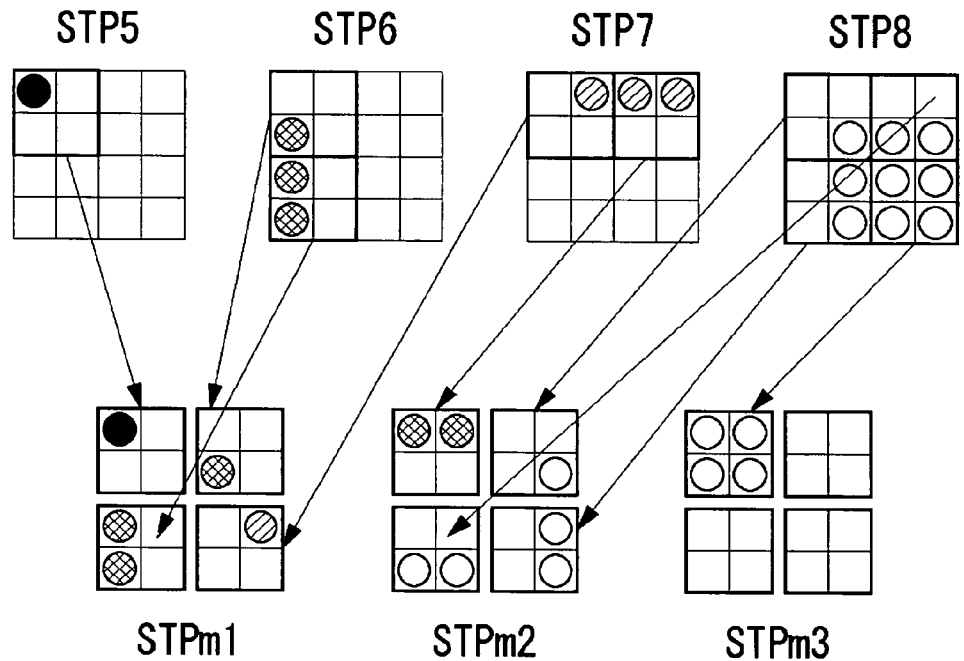
FIG. 10 shows another example of merging stamps.

FIG. 10 shows how other stamps STP5-STP8 are merged. These stamps have identical stamp address and there are no valid pixels occurring at identical positions.

First, the stamp STP5 is divided into four quads QDs0-QDs3. Since only the quad QDs0 includes a valid pixel, the quad QDs0 is written in the quad QDt0 of the target stamp STPt. The quads QDs1-QDs3 are discarded.

Subsequently, the stamp STP6 will be the source stamp STPs so that the quads QDs0-QDs3 are subject to merge. As a result, the quads QDs0 and QDs2 are written in the quads QDt1 and QDt2 of the target stamp STpt, and the quads QDs1 and QDs3 are discarded.

Subsequently, the stamp STP7 will be the next source stamp STPs. The quad QDs0 of the stamp STP7 is written in the quad QDt3 of the target stamp STpt. In this state, all quads in the target stamp STPt are valid so that the target stamp STPt is output as a merged stamp STPm1. The target stamp STPt is then initialized.

Subsequently, the quad QDs2 of the source stamp STPs is written in the quad QDt0 of a new target stamp STPt. The quads QDs1 and QDs3 are discarded.

The stamp STP8 will be the next source stamp. Since the quads QDs0-QDs3 all include valid pixels, the quads are written in the target stamp STPt without being discarded.

The quads QDs0-QDs2 are written in the quads QDt1-QDt3 of the target stamp STPt. In this state, all quads in the target stamp STPt are valid so that the target stamp STPt is output as a merged stamp STPm2. The target stamp STPt is initialized again.

The quad QDs3 of the source stamp STPs is written in the quad QDt0 of the new target stamp STPt. The quad QDt0 is then merged with quads from other source stamps STPs. The resultant target stamp is output as a merged stamp STPm3.

Figure 11:
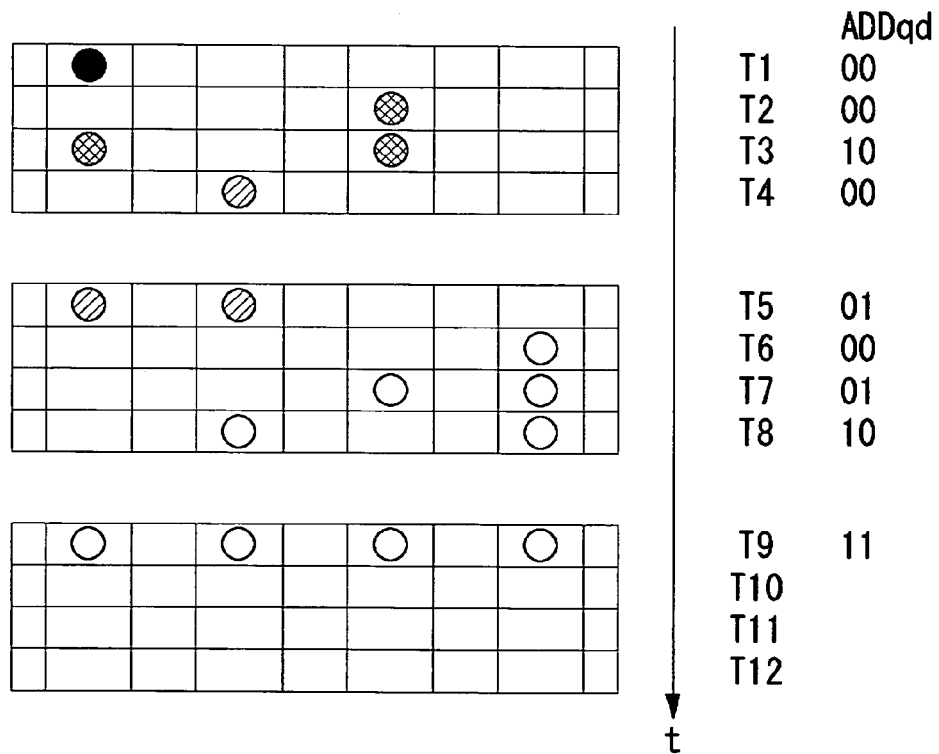
FIG. 11 shows how the quads are distributed to the output units in the area writer.

FIG. 11 shows how the quads QDm0-QDm3 are distributed to the output units 46a-46d in the area writer 40.

The area writer 40 outputs the four quads QDm0-QDm3 within the merged stamp STPm1 in the stated order at times T1, T2, T3 and T4, respectively.

The distributor 42 of the area writer 40 distributes the four pixels included in each quad to the respective output units. The merged stamp STPm1 is written in a period comprising times T1-T4; the merged stamp STPm2 is written in a period comprising times T5-T8; and the merged stamp STPm3 is written in a period comprising times T9-T12.

The quads QDm0-QDm3 constituting each of the merged stamps STPm1-STPm3 are output along with their addresses in the originating stamps STP5-STP7.

FIGS. 12A-12C show how the area writer 40 writes the merged stamps STPm1-STPm3 shown in FIG. 10 into the cache memory 50. At scheduled times, the area writer 40 refers to the addresses of the quads and writes the quads into the cache memory 50, relocating them.

As a result, as shown in FIG. 12C, the final stamp STPf in which the stamps STP5-STP8 are merged is written in the cache memory 50. The memory interface unit 110 in the subsequent stage writes the final stamp STPf in the graphics memory 120.

Thus, according to the image processing apparatus 1000 of this embodiment, stamps, which are pixel groups representing units of processing output from the rasterizing unit 10, are divided into quads, which are smaller pixel groups. Unnecessary quads are discarded and quads that survived are merged. This can increase the number of valid pixels including in merged stamps obtained as a result of merge, resulting in an efficient rendering process.

It will be particularly noted that the nature of a triangle strip is likely to generate a series of stamps which have an identical stamp address and in which valid pixels do not occur at identical positions. Accordingly, by merging a series of stamps efficiently, the number of valid pixels can be increased.

The image processing apparatus according to this embodiment temporarily divides the stamps into quads for pixel-based determination as to whether merge is possible, while the actual process of merge is quad-based. Accordingly, a favorable balance is achieved between implementation cost and processing efficiency.

Further, the merged stamp STPm produced by the area discarder 30 is corrected by the area writer 40 into a final stamp STPf, which is ultimately output, through localized, intra-stamp relocation. Relocation performed by the area writer 40 is implemented by control of addresses in the cache memory 50 and relocation using cross bars. Addition or modification in hardware is required only in the memory access unit. The inventive approach can easily be implemented in conventional image processing apparatuses.

Second Embodiment

The second embodiment represents an improvement in which the stamp merge process described with reference to the first embodiment is expanded. In the first embodiment, quads are subject to merge only when the source stamp STPs has an identical stamp address as the target stamp STPm. The characteristic feature of the second embodiment is that merge of stamps having different stamp addresses is permitted. Hereinafter, merge wherein merge of stamps having different stamp addresses is permitted will be referred to as an expanded merge.

Figure 13:
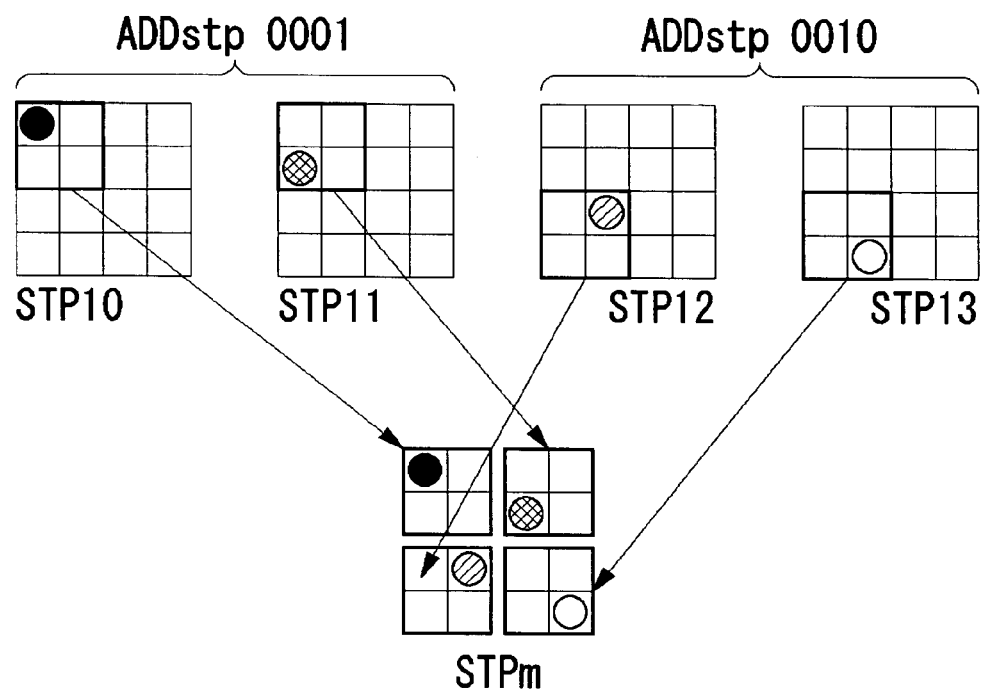
FIG. 13 shows how merge proceeds according to a second embodiment when stamps having different stamp addresses are input in succession.

FIG. 13 shows how merge proceeds when stamps having different stamp addresses are input in succession. Stamps STP10-STP13 are sequentially input from the rasterizing unit 10 to the area divider 20. It will be assumed that the stamp address ADDstp of the stamps STP10 and STP11 is 0001 and the stamp address ADDstp of the stamps STP12 and STP13 is 0010. None of the valid pixels in the stamps STP10-STP13 occurs at identical positions.

The area divider 20 uses the stamp STP10 as the source stamp STPs and divides the stamp STP10 into quads QDs0-QDs3. The quad QDs0 is written in the quad QDt0 of the target stamp STPt, and the quads QDs1-QDs3 are discarded.

Subsequently, the stamp STP11 will be the source stamp STPs and is divided into the quads QDs0-QDs3. The quad QDs0 is written in the quad QDt1 of the target stamp STPt.

Subsequently, the stamp STP12 will be the source stamp and is divided into the quads QDs0-QDs3. The quad QDs2 is written in the quad QDt2 of the target stamp STPt.

Subsequently, the stamp STP13 will be the source stamp and is divided into the quads QDs0-QDs3. The quad QDs2 is written in the quad QDt3 of the target stamp STPt.

The quads not written in the target stamp STPt are all discarded.

In this state, all quads in the target stamp STPt are valid so that the target stamp STPt is output as a merged stamp STPm, and the target stamp is initialized.

Quads QDm0-QDm3 included in the merged stamp STPm maintain their quad addresses ADDqd in the originating stamps STP10-STP13 along with the stamp addresses ADDstp of the originating stamps STP10-STP13.

Figure 14:
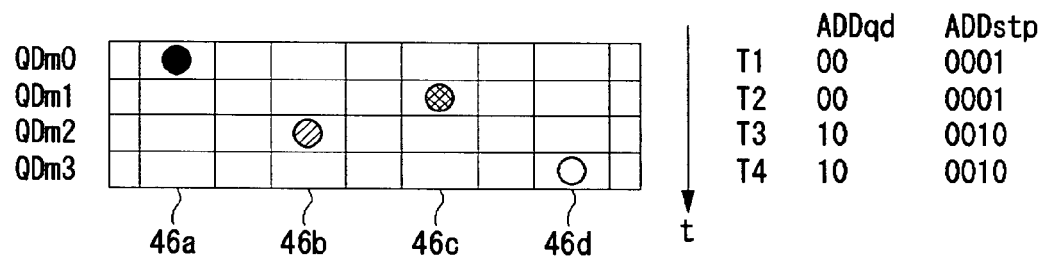
FIG. 14 shows how the quads are distributed to the output units in the area writer.

FIG. 14 shows how the quads QDm0-QDm3 are distributed to the output units 46a-46d in the area writer 40. The memory access unit 44 of the area discarder 30 outputs the four quads QDm0-QDm3 within the merged stamp STPm in the stated order at times T1, T2, T3 and T4, respectively. At time T1, the quad QDm0 is decomposed into pixels, which are simultaneously output in parallel.

Subsequently, the quads QDm1-QDm3 are decomposed into pixels and are sequentially output at times T2, T3 and T4, respectively.

FIGS. 15A-15C show how the area writer 40 writes the merged stamp STPm of FIG. 13 into the cache memory 50.

As shown in FIG. 15A, the area writer 40 refers to the stamp address ADDstp in addition to the quad address ADDqd, in writing the quads QDm. For example, the quad QDm0 input at time T1 has a stamp address of 0001 and a quad address of 00, the quad QDm0 is written in an associated address in the cache memory 50. A similar thing is true of the quads QDm1-QDm3.

As a result, as shown in FIG. 12C, the final stamps STPf1 and STPf2 in which the stamps STP10-STP13 of FIG. 10 are merged are written into the cache memory 50. The final stamp STPf1 is a result of merging the stamps STP10 and STP11. The final stamp STPf2 is a result of merging the stamps STP12 and STP13. The final stamps STPf1 and STPf2 are written in positions with the stamp addresses ADDstp of 0001 and 0010.

By performing expanded merge according to the embodiment in which stamps having different addresses are temporarily merged, the number of times that the area writer 40 accesses the cache memory 50 can be reduced.

According to expanded merge, merge can be performed even if stamp addresses differ. Therefore, the number of valid quads within a merged stamp can be increased and efficiency in image processing can be improved.

The embodiment described is only illustrative in nature and various variations in constituting elements and processes involved are possible. Those skilled in the art would readily appreciate that such variations are also within the scope of the present invention.

In the described embodiments, a stamp comprising 4×4 pixels forms a pixel group, and a quad comprising 2×2 pixels forms a small pixel group. Other configurations are also possible. For example, an array of 1×4 pixels may form a small pixel group, or an array of 4×1 pixels may form a quad.

The number of pixels included in a quad is preferably, but not necessarily, equal to the number of pixels simultaneously written in the cache memory 50 in parallel. The number of pixels included in a quad may be two, in a configuration in which four pixels are simultaneously written in the cache memory 50 in parallel. The size of a stamp and the size of a quad may appropriately be determined by considering the hardware cost and the cost required in implementing the process.

While the preferred embodiments of the present invention have been described using specific terms, such description is for illustrative purposes only, and it is to be understood that changes and variations may be made without departing from the spirit or scope of the appended claims.

The invention claimed is:

1. An image processing apparatus which renders, in a screen coordinate system, unit figures each constituting the surface of a three-dimensional object to be rendered, comprising:

a rasterizing unit which divides a unit figure into a plurality of unit areas on the screen coordinate system and outputs the unit areas;

an area divider which divides each of the unit areas output from the rasterizing unit into a plurality of subareas;

an area discarder which discards a subarea obtained by the division by the area divider and not including any valid pixels, which locates subareas that survived the discarding according to a predetermined rule that arranges the subareas in a predetermined order without creating any intervals between the subareas, while allowing a change in the relative position of the subarea in the originating unit area to which the subarea belonged before the division, so as to generate a merged area, and which generates positional information indicating the relative position of each subarea included in the merged area within the unit area to which the subarea belonged before the division; and an area writer which writes the subareas included in the merged area into a memory and which relocates each subarea in its original position by writing the subarea in an address corresponding to the positional information.

2. The image processing apparatus according to claim 1, wherein the area discarder generates the merged area by sequentially locating subareas that survived the discarding and that do not include any valid pixels at the same coordinate positions in the screen coordinate system, and when a subarea that includes valid pixels at the same coordinate positions in the screen coordinate system as any of the subareas hitherto located is input, the area discarder outputs the merged area including the subareas hitherto located and starts generating a next merged area.

3. The image processing apparatus according to claim 1, wherein each of the merged areas has the same size as the unit area.

4. The image processing apparatus according to claim 1, wherein the size of the subarea corresponds to a unit throughput in which the area writer writes the subareas into the memory.

5. The image processing apparatus according to claim 1, wherein, of the subareas that survived the discarding process by the area discarder, the area discarder merges subareas derived from unit areas having the same coordinates in the screen coordinate system before the division.

6. The image processing apparatus according to claim 1, wherein the unit area is a rectangular area, the rasterizing unit divides a rendering area so that each of the plurality of unit areas includes a pixel group, the pixel number in the vertical direction and the pixel number in the horizontal direction of a pixel group in a given unit area being identical with the corresponding numbers of a pixel group in another unit area, and the area divider divides the unit area including the pixel group into a plurality of subareas each including a small pixel group, the pixel number in the vertical direction and the pixel number in the horizontal direction of a pixel group in a given subarea being identical with the corresponding numbers of a pixel group in another subarea.

7. The image processing apparatus according to claim 1, wherein, of the subareas that survived the discarding, the area discarder permits merging of subareas that belonged to unit areas, which before the division were located at different coordinate positions in the screen coordinate system, the area discarder further generates, in addition to the merged area and the positional information, second positional information indicating the position, in the screen coordinate system, of the unit area to which each of the subareas included in the merged area belonged before the division, and the area writer relocates each subarea in its original position by writing the subarea in an address corresponding to the positional information and the second positional information.

8. The image processing apparatus according to claim 1, wherein the area writer comprises a memory access unit which writes pixels included in the subarea into the memory in parallel.

9. An image processing method which renders, in a screen coordinate system, unit figures each constituting the surface of a three-dimensional object to be rendered, comprising:

rasterizing by dividing a unit figure into a plurality of unit areas on the screen coordinate system and outputting the unit areas;

dividing each of the unit areas output from the rasterizing into a plurality of subareas;

discarding a subarea obtained by the division and not including any valid pixels, locating subareas that survived the discarding according to a predetermined rule that arranges the subareas in a predetermined order without creating any intervals between the subareas, while allowing a change in the relative position of the subarea in the originating unit area to which the subarea belonged before the division, so as to generate a merged area, and maintaining positional information indicating the relative position of each subarea included in the merged area within the unit area to which the subarea belonged before the division; and writing the subareas included in the merged area into a memory and relocating each subarea in its original position by writing the subarea in an address corresponding to the positional information.

10. The image processing method according to claim 9, wherein the discarding generates the merged area by sequentially locating subareas that survived the discarding and that do not include any valid pixels at the same coordinate positions in the screen coordinate system, and when a subarea that includes valid pixels at the same coordinate positions in the screen coordinate system as any of the subareas hitherto located is input, the merged area including the subareas hitherto located is output and generation of a next merged area is started.

11. The image processing method according to claim 9, wherein the rasterizing divides a rendering area so that each of the plurality of unit areas includes a pixel group, the pixel number in the vertical direction and the pixel number in the horizontal direction of a pixel group in a given unit area being identical with the corresponding numbers of a pixel group in another unit area, and the unit area dividing divides the unit area including the pixel group into a plurality of subareas each including a small pixel group, the pixel number in the vertical direction and the pixel number in the horizontal direction of a pixel group in a given subarea being identical with the corresponding numbers of a pixel group in another subarea.

12. A non-transitory computer-readable recording medium having stored therein a program which when executed cause a computer to render, in a screen coordinate system, unit figures each constituting the surface of a three-dimensional object to be rendered, comprising:

a dividing module which causes a computer to divide a unit figure into a plurality of unit areas on the screen coordinate system and which divides each of the unit areas into a plurality of subareas and outputs the subareas;

a module which causes a computer to discard a subarea obtained by the division and not including any valid pixels, locate subareas that survived the discarding according to a predetermined rule that arranges the subareas in a predetermined order without creating any intervals between the subareas, while allowing a change in the relative position of the subarea in the originating unit area to which the subarea belonged before the division, so as to generate a merged area, and maintain positional information indicating the relative position of each subarea included in the merged area within the unit area to which the subarea belonged before the division; and a module which causes a computer to write the subareas included in the merged area into a memory and relocating each subarea in its original position by writing the subarea in an address corresponding to the positional information.

13. The non-transitory computer-readable medium according to claim 12, wherein the merged area is generated by sequentially locating subareas that survived the discarding and that do not include any valid pixels at the same coordinate positions in the screen coordinate system, and when a subarea that includes valid pixels at the same coordinate positions in the screen coordinate system as any of the subareas hitherto located is input, the merged area including the subareas hitherto located is output and generation of a next merged area is started.

* * * * *